United States Patent [19]
Ashton et al.

[11] 3,912,749
[45] Oct. 14, 1975

[54] CERTAIN N-THIO DERIVATIVES OF THIAZOLIDINONES

[75] Inventors: Stanley Ashton; Gwilym Thomas Jones; Vijay Ratna Sharma; John Anthony Taylor, all of Manchester, England

[73] Assignee: Imperial Chemical Industries Limited, London, England

[22] Filed: July 30, 1973

[21] Appl. No.: 383,550

[30] Foreign Application Priority Data
Aug. 18, 1972 United Kingdom............... 38620/72

[52] U.S. Cl........................... 260/306.7 R; 260/780
[51] Int. Cl.² ........................................ C07D 277/04
[58] Field of Search ............................ 260/306.7 R

[56] References Cited
UNITED STATES PATENTS

| | | | |
|---|---|---|---|
| 2,553,775 | 5/1951 | Hawley et al. ............... | 260/306.7 R |
| 3,158,537 | 11/1964 | Goodhue et al. ............ | 260/306.7 R |
| 3,499,030 | 3/1970 | Kuhle et al................... | 260/306.7 R |

Primary Examiner—Richard J. Gallagher
Attorney, Agent, or Firm—Cushman, Darby & Cushman

[57] ABSTRACT

Thiazolidinones, prepared from ketones, α-thioacids and ammonia, are converted into the N-thio derivatives by treatment with sulphenyl halides. The N-thio derivatives are inhibitors of premature vulcanisation of rubbers.

3 Claims, No Drawings

CERTAIN N-THIO DERIVATIVES OF THIAZOLIDINONES

This invention relates to thiazolidinones and more particularly to substituted thiazolidinones of value as inhibitors of premature vulcanisation in rubber.

It is customary in the manufacture of vulcanised rubbers to incorporate into the unvulcanised rubber various additives such as antioxidants, antiozonants, fillers, vulcanisation activators, etc., and lastly vulcanisation accelerators and a vulcanising agent such as sulphur. The compounded rubber is then shaped and finally raised to vulcanisation temperature. Before the final stage however some premature vulcanisation may take place, especially during the compounding stage in a mill or Banbury mixer when heat is generated, or during handling such as calendering or extruding, or in some cases even during storage. Premature vulcanisation causes the rubber to become lumpy with the result that subsequent processing or vulcanising operations cannot be carried out satisfactorily. Premature vulcanisation may be reduced by using delayed action accelerators of for example the benzthiazylsulphenamide type and also by the use of retarders such as N-nitrosodiphenylamine or salicylic acid, but these retarders frequently introduce other difficulties. No satisfactory means of preventing premature vulcanisation has hitherto been found and the increasing use of furnace carbon blacks and of antioxidants and antiozonants based on p-phenylenediamine has exacerbated the problem. It has now been found that certain novel substituted 1,3-thiazolidin-4-ones are powerful inhibitors of premature vulcanisation.

According to the invention there are provided thiazolidinones of the formula

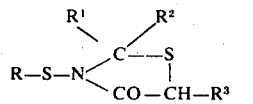   (I)

wherein R is an optionally substituted hydrocarbyl group, and $R^1$, $R^2$ and $R^3$, which may be the same or different, are each a hydrogen atom or an optionally substituted hydrocarbyl group.

As examples of optionally substituted hydrocarbyl groups which may be represented by R, $R^1$, $R^2$ or $R^3$ there are mentioned alkyl groups such as methyl, ethyl, n-propyl, iso-propyl, n-butyl, sec.-butyl, tert.-butyl, n-hexyl, n-octyl, tert.-octyl, n-dodecyl, tert.-dodecyl, n-hexadecyl, tert.-hexadecyl and n-octadecyl, alkenyl groups such as n-propenyl, iso-butenyl, n-butenyl, n-hexenyl, dodecenyl and octadecenyl, cylcloalkyl groups such as cyclopentyl, cyclohexyl, cycloheptyl and cyclooctyl, aryl groups such as phenyl, α-naphthyl and β-naphthyl, and substituted derivatives of these such as 4-nitrophenyl, 4-methoxyphenyl, 2,4-dichlorophenyl, 2,3,4,5,6-pentachlorophenyl, 2,4-dimethylphenyl, 2-ethoxycarbonylphenyl, 4-phenylsulphonylphenyl, 3-methylphenyl and trichloromethyl.

$R^1$ and $R^2$ together with the carbon atom joining them may form a ring which is preferably carbocyclic but which may be heterocyclic, for example cyclopentylidene, cyclohexylidene or cyclooctylidene.

It is preferred that R be alkyl, particularly secondary alkyl such as isopropyl, sec-butyl or cyclohexyl, that $R^1$ and $R^2$ each be alkyl such as ethyl or aryl especially phenyl or substituted aryl such as 4-methoxyphenyl and $R^3$ be lower alkyl such as methyl.

As examples of thiazolidinones of the invention there are mentioned 2,2-dimethyl-3-(n-butylthio)thiazolidin-4-one, 2,2-dimethyl-3-(iso-propylthio)thiazolidin-4-one, 2-methyl-2-phenyl-3-(isopropylthio)thiazolidin-4-one, 2-phenyl-3-(isopropylthio)thiazolidin-4-one, 2,2,5-trimethyl-3-(tert.-butylthio)thiazolidin-4-one, 3-phenylthio-1,3-thiazolidin-4-one, 3-tert.-butylthio-1,3-thiazolidin-4-one, 3-n-hexylthio-1,3-thiazolidin-4-one, 3-tert.-dodecylthio-1,3-thiazolidin-4-one, 3-cyclohexylthio-1,3-thiazolidin-4-one, 3-(p-methyxyphenylthio)-1,3-thiazolidin-4-one, 3-(p-tolylthio)-1,3-thiazolidin-4-one, 3-(p-chlorophenylthio)-1,3-thiazolidin-4-one, 3-(p-chlorophenylthio)-1,3-thiazolidin-4-one, 2,2-diphenyl-3-isopropylthio-1,3-thiazolidin-4-one, 2,2-pentamethylene-3-isopropylthio-1,3-thiazolidin-4-one and 2,2-pentamethylene-3-phenylthio-1,3-thiazolidin-4-one.

According to the invention there is also provided a process for the manufacture of thiazolidinones of Formula I which comprises reacting a compound of the formula

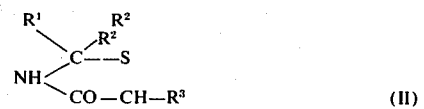   (II)

with a sulphenyl halide of the formula R-S-Halogen, wherein R, $R^1$, $R^2$ and $R^3$ have the meanings given hereinbefore.

The process is conveniently carried out at a temperature preferably between 0° and 50°, preferably in an inert solvent such as toluene, cyclohexane, carbon tetrachloride or pentane and in presence of an acid-binding agent such as triethylamine, pyridine, N,N-dimethylaniline, sodium carbonate or calcium carbonate.

The amount of sulphenyl halide, preferably chloride or bromide, is preferably about 1.0 molar proportions.

The thiazolidinone may be conveniently isolated by evaporating most of the solvent and crystallising from solvents such as ethanol in the case of solids or by chromatography over silica gel in the case of liquids.

The compounds of formula II used in the process of the invention are readily prepared by reacting a ketone of the formula $R^1 R^2 CO$, a mercapto acid of the formula $HSCHR^2.CO_2H$ and ammonia for example in boiling benzene with azeotropic removal of water as it is formed.

According to the invention there is further provided a process for reducing the premature vulcanisation of a rubber containing a vulcanising agent and a vulcanisation accelerator which comprises incorporating in the rubber a thiazolidinone of formula I.

The vulcanising agent used in this second process of the invention may be a sulphur donor, such as N,N'-dithiobismorpholine, N,N'-dithiobiscaprolactam, tetramethylthiuram disulphide, diethylthiophosphoryl disulphide or diethylthiophosphoryl trisulphide or preferably elemental sulphur, or for example a peroxide or other type of vulcanising agent.

The vulcanisation accelerator used in the second process of the invention is preferably a sulphenamide such as N-cyclohexylbenzothiazole-2-sulphenamide, N-t-butylbenzothiazole-2-sulphenamide, N-diethyleneoxybenzothiazole-2-sulphenamide or N-dicyclohexylbenzothiazole-2-sulphenamide, a thiazole such as mercaptothiazole, 2-mercaptobenzothiazole or dibenzothiazyl disulphide or a thiuram such as tetramethylthiuram monosulphide, tetramethylthiuram disulphide, tetramethylthiuram tetrasulphide, tetraethylthiuram monosulphide, tetraethylthiuram disulphide, or a metal salt of a dithiocarbamate such as zinc dimethyldithiocarbamate or sodium diethyldithiocarbamate.

Other types of accelerator may however be used such as diaryl guanidines, thioureas, xanthates or aldehyde-amine condensates, or mixtures of any of these and the above accelerators.

The amount of vulcanisation accelerator may be that conventionally used in the manufacture of rubber vulcanisates.

The amount of thiazolidinone may be from 0.01 to 5.0 % and preferably from 0.05 to 2.5 % of the weight of the rubber.

Rubbers which may be used in the second process of the invention include both natural and synthetic rubbers and mixtures thereof. The synthetic rubber may in general be any polymeric material containing olefinic unsaturation and capable of being cross-linked by for example sulphur, peroxide or other crosslinking agents. Examples of synthetic rubbers include cis-polybutadiene, butyl rubber, ethylene-propylene terpolymer, polymers of 1,3-butadienes such as isoprene and chloroprene and copolymers of 1,3-butadiene with other monomers such as styrene, acrylonitrile and isobutylene.

The thiazolidinones may be incorporated into the rubber mix by any conventional dry rubber or latex compounding procedure for example on a rubber mill, in an internal mixer, through a screw type extruder-blender, blending as a solution in an organic solvent, or as an emulsion or aqueous dispersion.

The rubber mix may also contain conventional rubber adjuvants such as antioxidants, antiozonants, fillers, peptising agents, pigments, blowing agents, and accelerator activators such as zinc oxide and stearic acid.

The invention is of particular value when the rubber mix is reinforced with a furnace black or contains a p-phenylene diamine-based antiozonant since such rubber mixes are especially prone to premature vulcanisation.

By the second process of the invention there are obtained vuncanisable rubber compositions which can be handled on conventional rubber processing machines or stored for long periods with little tendency to premature vulcanisation but which will cure readily at conventional vulcanisation temperatures to give vulcanisates of excellent physical properties. These unvulcanised rubber compositions, their vulcanisation by heating to vulcanisation temperatures, and the vulcanisates so obtained are further features of this invention.

The invention is illustrated but not limited by the following Examples in which all parts and percentages are by weight unless otherwise stated.

EXAMPLE 1

A solution of 11.05 parts of isopropylsulphenyl chloride in 50 parts of carbon tetrachloride was added dropwise to a stirred solution of 12.9 parts of 2,2-dimethyl-1,3-thiazolidin-4-one and 12.0 parts of triethylamine in 50 parts of carbon tetrachloride. After stirring at 30° for 30 minutes the precipitated triethylamine hydrochloride was removed by filtration and the solvent was evaporated under reduced pressure to leave a semi-solid which on crystallisation from hexane gave 6.0 parts of 2,2-dimethyl-3-isopropylthio-1,3-thiazolidin-4-one as a colourless solid m.p. 48°–49°. Found, C, 46.2; H, 7.5, N, 6.9 %. $C_8H_{15}NOS_2$ requires C, 46.8; H, 7.4; N, 6.8 %.

EXAMPLE 2

2,2-Diethyl-3-isopropylthio-1,3-thiazolidin-4-one was prepared by the general procedure of Example 1 except that purification was effected by chromatography over silicagel, with elution by carbon tetrachloride, whereupon the compound was obtained as a colourless oil. Found, C, 51.9 ; H, 8.4; N, 6.9 %. $C_{10}H_{19}NOS_2$ requires C, 51.5; H, 8.1; N, 6.0 %.

EXAMPLE 3

2-Methyl-2-phenyl-3-isopropylthio-1,3-thiazolidin-4-one was made by the procedure of Example 1. Crystallisation of the crude reaction product from petroleum ether (b.p. 60°–80°) gave the product (A) as a colourless solid m.p. 68°–70°.

The following compounds were made similarly:
(B) 2,2-Spiro(cyclohexane)-3-isopropylthio-1,3-thiazolidin-4-one, colourless solid, m.p. 90°–92°C and
(c) 2-phenyl-3-isopropylthio-1,3-thiazolidin-4-one, colourless solid, m.p. 88°–89°C.

EXAMPLE 4

| | |
|---|---|
| Natural rubber (smoked sheet) | 100 |
| Zinc oxide | 3.5 |
| Stearic acid | 3 |
| Carbon Black (HAF/N-330) | 45 |
| Process Oil | 3.5 |
| Sulphur | 2.5 |
| N-cyclohexyl-2-benzthiazylsulphenamide | 0.5 |
| Retarder (when used) | 0.25 |

The above ingredients were mixed on a 2-roll laboratory rubber mixing mill in conventional manner. The mixed sheeted stock was tested for scorch and cure characteristics in a Mooney Rotating Disc Plastometer and an Oscillating Disc Rheometer. The results were as follows.

| Retarder | Mooney Scorch at 120°C Minimum + 10 (mins) | Rheometer curing characteristics | | |
|---|---|---|---|---|
| | | Induction time $T_2$ (mins) | Torque (inch/lbs) at 95% peak | Time to reach 95% Peak Torque(mins) |
| Nil | 22 | 7.4 | 50 | 20.2 |
| Product of Example 2 | 63 | 13.4 | 50 | 24.6 |

EXAMPLE 5

Using the same Base Mix and technique as in Example 4 further retarders were tested for their effect on Mooney scorch property with the results given below:

| | Mooney scorch time at 120°C (minimum + 10) Minutes. |
|---|---|
| Nil | 22.5 |
| Product A of Example 3 | 41 |
| Product B of Example 3 | 40 |
| Product of Example 1 | 43 |

We claim:

1. A thiazolidinone of the formula:

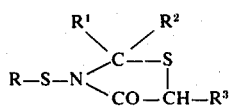

(I)

wherein R is isopropyl, sec-butyl, or cyclohexyl, $R^1$ and $R^2$ are hydrogen, alkyl containing from one to four carbon atoms, phenyl, tolyl, methoxyphenyl, or chlorophenyl, or together are pentamethylene, and $R^3$ is hydrogen or methyl.

2. A thiazolidinone according to claim 1 wherein $R^1$ and $R^2$ are ethyl.

3. A thiazolidinone according to claim 1 selected from the group consisting of 2,2-dimethyl-3-isopropylthio-1,3-thiazolidin-4-one, 2,2-diethyl-3-isopropylthio-1,3-thiazolidin-4-one, 2-methyl-2-phenyl-3-isopropylthio-1,3-thiazolidin-4-one, 2,2-spiro(cyclohexane)-3-isopropylthio-1,3-thiazolidin-4-one, and 2-phenyl-3-isopropylthio-1,3-thiazolidin-4-one.

* * * * *